US012441172B2

(12) United States Patent
Ankit et al.

(10) Patent No.: US 12,441,172 B2
(45) Date of Patent: Oct. 14, 2025

(54) VEHICLE

(71) Applicant: TVS MOTOR COMPANY LIMITED, Chennai (IN)

(72) Inventors: Rawat Ankit, Chennai (IN); Meibalan Mugilan, Chennai (IN); Ashutosh, Chennai (IN); Subramoniam Chithambaram, Chennai (IN)

(73) Assignee: TVS Motor Company Limited, Chennai (IN)

( * ) Notice: Subject to any disclaimer, the term of this patent is extended or adjusted under 35 U.S.C. 154(b) by 266 days.

(21) Appl. No.: 17/917,733

(22) PCT Filed: Mar. 23, 2021

(86) PCT No.: PCT/IN2021/050300
§ 371 (c)(1),
(2) Date: Oct. 7, 2022

(87) PCT Pub. No.: WO2021/205467
PCT Pub. Date: Oct. 14, 2021

(65) Prior Publication Data
US 2023/0158879 A1  May 25, 2023

(30) Foreign Application Priority Data

Apr. 9, 2020  (IN)  ............................. 202041015497

(51) Int. Cl.
*B60K 1/04* (2019.01)
*B60K 11/06* (2006.01)
(Continued)

(52) U.S. Cl.
CPC ................ *B60K 1/04* (2013.01); *B60K 11/06* (2013.01); *B60K 11/085* (2013.01);
(Continued)

(58) Field of Classification Search
CPC . B60L 2200/46; B60K 1/04; B60K 2001/005; B60K 2001/006
See application file for complete search history.

(56) References Cited

U.S. PATENT DOCUMENTS

| 9,308,810 B1* | 4/2016 | Kurdy | B60K 7/00 |
| 2009/0127008 A1* | 5/2009 | Batdorf | B60K 6/48 |
| | | | 29/401.1 |

(Continued)

FOREIGN PATENT DOCUMENTS

| CH | 702017 A2 | 4/2011 |
| EP | 2612805 A1 | 7/2013 |

OTHER PUBLICATIONS

International Search Report issued in corresponding International Application No. PCT/IN2021/050300 mailed Jul. 13, 2021 (6 pages).

(Continued)

*Primary Examiner* — Brian L Swenson
(74) *Attorney, Agent, or Firm* — Osha Bergman Watanabe & Burton LLP

(57) ABSTRACT

A multi wheeled vehicle includes: a body frame that includes a head pipe; a conversion assembly that includes an electric machine operatively connected to a transmission assembly; and a housing configured to accommodate at least one electronic component and at least one electrochemical cell, the housing being attached to the electric machine, the conversion assembly being mounted to a front lower portion of the body frame by means of one or more engine mounting brackets, and the conversion assembly being disposed below a fuel tank with at least a portion of the conversion assembly being overlapping a side cover of the multi wheeled vehicle in a vehicle side view.

19 Claims, 8 Drawing Sheets

(51) Int. Cl.
  *B60K 11/08* (2006.01)
  *B60K 1/00* (2006.01)
(52) U.S. Cl.
  CPC .. *B60K 2001/005* (2013.01); *B60K 2001/006* (2013.01); *B60K 2001/0405* (2013.01); *B60Y 2200/12* (2013.01); *B60Y 2410/10* (2013.01)

(56) References Cited

U.S. PATENT DOCUMENTS

| | | | |
|---|---|---|---|
| 2012/0000721 A1* | 1/2012 | Lipski | B60K 6/52 180/65.21 |
| 2012/0048630 A1 | 3/2012 | Nishiura et al. | |
| 2013/0325207 A1* | 12/2013 | Gunther | B60L 3/04 903/905 |
| 2014/0262567 A1* | 9/2014 | Kedzierski | B60L 50/64 180/65.1 |
| 2022/0032765 A1* | 2/2022 | Kitamura | B62K 11/10 |
| 2022/0033027 A1* | 2/2022 | Kaneko | B62K 11/04 |
| 2022/0033034 A1* | 2/2022 | Kaneko | B62K 11/04 |
| 2023/0361710 A1* | 11/2023 | Sreeju | H02P 25/03 |

OTHER PUBLICATIONS

Written Opinion issued in corresponding International Application No. PCT/IN2021/050300 mailed Jul. 13, 2021 (12 pages).

\* cited by examiner

VEHICLE

TECHNICAL FIELD

The present subject matter relates to a multi wheeled vehicle. More particularly, to multi-fuel vehicle platform.

BACKGROUND

Conventionally, the vehicles are powered by an internal combustion (IC) engine. The internal combustion (IC) engine comprises a cylinder head, abutting a cylinder block to form a combustion chamber where the burning of air fuel mixture occurs. The cylinder head comprising of an intake valve and an exhaust valve which control the intake of air fuel mixture inside the combustion chamber, and controls the exit of exhaust gases after the combustion. The exhaust gases include harmful emissions of hydrocarbons, carbon monoxide and nitrogen oxides into the atmosphere. Further, the high cost of fossil-based fuel and its impact on pollution is leading to research and development of alternate technologies.

BRIEF DESCRIPTION OF THE DRAWINGS

The detailed description is described with reference to an embodiment of a two wheeled saddle type motorcycle along with the accompanying figures. The same numbers are used throughout the drawings to reference like features and components.

DETAILED DESCRIPTION

Figure 1:
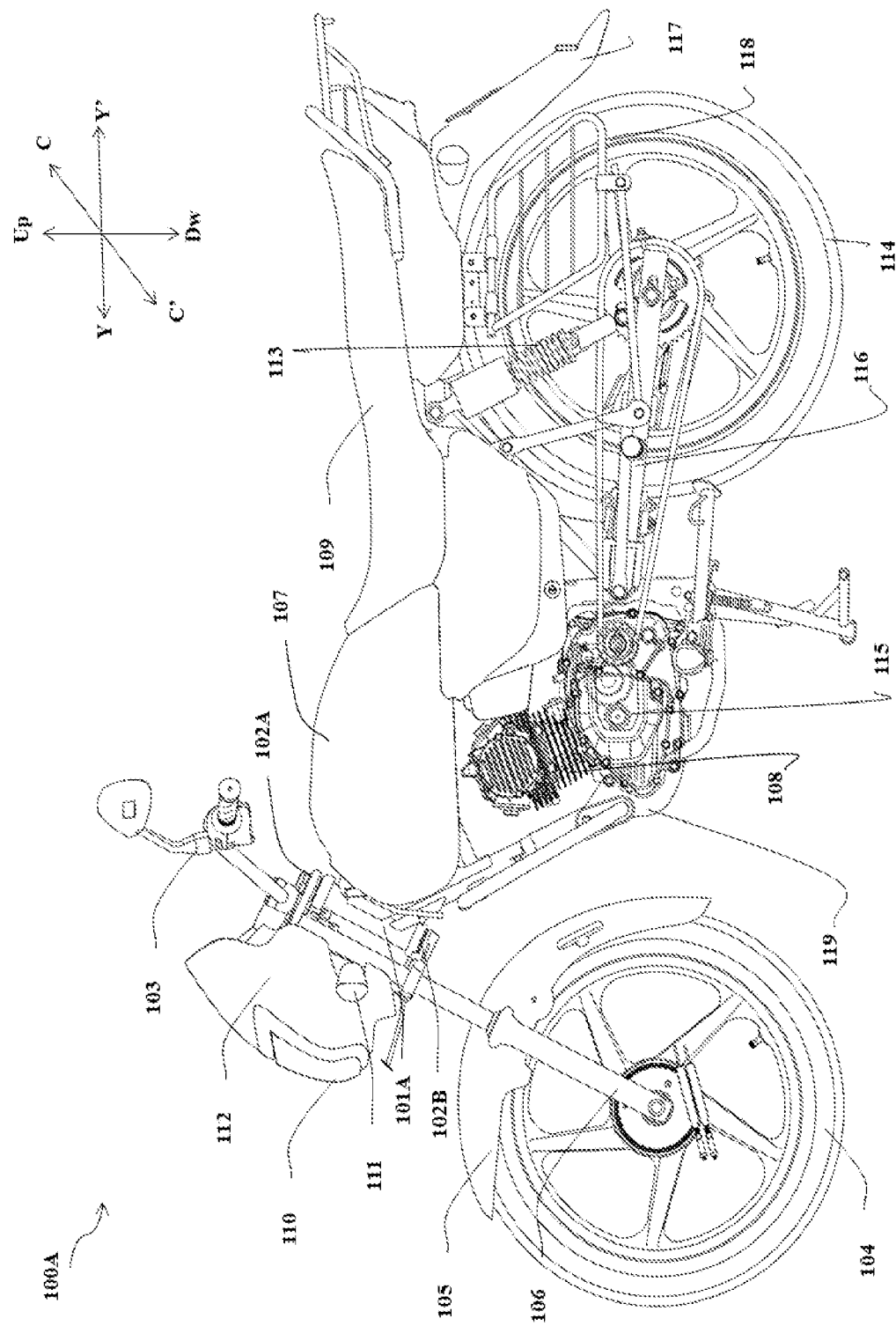
FIG. 1 (Prior art) illustrates a left side view of a multi wheeled vehicle.

Various features and embodiments of the present invention here will be discernible from the following further description thereof, set out hereunder. Further "front" and "rear", and "left" and "right" referred to in the ensuing description of the illustrated embodiment refer to front and rear, and left and right directions as seen from a rear portion of the vehicle and looking forward. Furthermore, a longitudinal axis Y-Y' unless otherwise mentioned, refers to a front to rear axis relative to the vehicle, while a lateral axis C-C' unless otherwise mentioned, refers generally to a side to side, or left to right axis relative to the vehicle.

However, it is contemplated that the disclosure in the present invention may be applied any vehicle without defeating the spirit of the present subject matter. The detailed explanation of the constitution of parts other than the present invention which constitutes an essential part has been omitted at suitable places.

Typically, automobile industry is driven by changing customer needs, new technologies and upcoming regulations. The automobile manufacturers are perpetually setting the focus on development of alternative technologies and concepts. The alternate technologies include electric vehicles, fuel cell powered vehicles etc. But, today the electric vehicles are rapidly becoming a mainstay in vehicle product lines to reduce the environmental impact of conventional vehicles. The original equipment manufacturer (OEMs) and customers are being driven down a path to reduce carbon dioxide emissions by electrifying the drivetrain which has the capability to propel the vehicles. At the same time enabling space inside the vehicles to allow large enough battery pack to give adequate range and torque.

In automobiles torque and speed are important parameters. The torque and speed can vary as per different segment of the vehicles. Likewise, the electric vehicles are designed by keeping these two parameters in mind. However, the power generated from an electric motor when transmitted directly to a drive wheel will lead to inappropriate torque because a direct drive results in uncontrolled speed or sub-optimal speed. Hence, it is always a challenge for the automobile designers to have appropriate balance between both torque and speed. Therefore, to achieve different speed at varying loads similarly different torque at different loads requires optimal transmission ratios/system. However, a trade-off between torque requirement and range of the vehicle is a contradictory challenge since typically at higher torque requirements the mileage or range of the vehicle drops. To assure an effective torque developed by the drive wheel special attention has been given to an electric drive and a power source i.e. batteries.

It is observed that a high capacity electric motor is generally employed and adapted to deliver more torque as per operating condition albeit at more weight and cost. Moreover, the higher capacity electric motors draw more power from the batteries. Thus, to increase the range of the electric vehicle the high watt-hour batteries are to be packaged within the electric vehicle in addition to the high capacity motors. Further, the high capacity motor and the high watt-hour batteries adversely affect the storage space in the vehicle. In addition to that, mounting of high capacity batteries and high watt hour batteries involve complete redesign of given frame assembly.

At the same time the automobile manufacturers need to cater to different market segments and users with product offerings and variants meeting demands of respective users. These could involve variants in form of size, capacity of vehicle, range of usage, cost, ease of manufacturing, etc. From manufacturer's points of view, once a platform product is designed, the product economics would be viable based on the numbers sold. Therefore, it is always a challenge for automobile manufacturer to have vehicle layout and design which can be flexible to cater to the variants and the demands and enable modified versions with minimum changes in the vehicle layout, assembly time, manufacturing set-up etc. The challenge is further complicated when the vehicle architecture/platform requirement needs to cater to different powertrains like Internal combustion engine (ICE)

to an Electric Powertrain or a Hybrid powertrain. Thus, transition towards the electric vehicles is a major challenge for the OEM's in term of manufacturing, as it requires revamping of core processes to prepare for mass production of the electric vehicles.

Further, the principal drawbacks of the electric vehicles are relatively low energy capacity of the batteries as compared to an internal combustion powered vehicle running on hydrocarbon-based fuel. Furthermore, another demerit of the electric vehicles is the excessive time duration required to recharge a battery-based vehicle, as compared to the length of time to refuel a fossil fuel-powered vehicle. In some cases, layers of batteries are tiered one over the other in a heap to meet torque, range and speed demands which can approach 50 percent of the vehicle's weight. This impact is more significant particularly when the batteries are of the lead-acid variety.

Another challenge will be the volume and scrappage rate of existing hydrocarbon-based based vehicles during transition from internal combustion based vehicles to electric vehicles. However, one of the promising ways to address the said issue is to convert existing IC powered vehicles into electric vehicles including retrofit kit solutions. But existing conversion systems requires complete overhaul of the vehicles as existing conversion systems has an adverse impacts viz. size, layout, cost, weight, number of parts to accommodate the additional transmission components which adds more cost and weight. Moreover, in a conversion process the characteristic of the electric vehicles may get restricted & not meet the requirements as defined by the customer in accordance with his needs. Existing conversion systems offers no or inadequate flexibility to the customer.

It is further observed that the existing conversion systems have poor thermal management. As, the poor thermal management or no cooling can lead to reduction in battery performance, reduced cycle and life hence it is important to operate batteries in a desired temperature range. Further, cooling of batteries through external means, adds more weight and cost to the vehicle. In addition to that, such systems are more viable for a four wheeled vehicle owing to the feasibility of space & layout as well as the cost. However, for a straddle type two-wheeler or a three-wheeler, there exists a challenge to design a compact, low cost and efficient conversion system with good durability and reliability. Hence, there is a need for an improved conversion system for a vehicle overcoming all above problems & trade-offs as well as overcoming problems of known art.

Therefore, it is an object of the present invention to provide a conversion assembly to convert existing fossil fuel based vehicle with automatic or manual transmission into an electric vehicle.

It is another object of the present invention is to provide a conversion assembly of less weight and which is easy to install in the existing fossil fuel based vehicle in form of a retrofit kit solution.

It is yet another object of the present invention is to provide a conversion assembly which gives economical solution to customers in terms of efficiency and emission reduction.

It is an object of the present invention is to provide a conversion assembly which can be coupled to the platform of new vehicle by the OEM's.

It is another object of the present invention to provide a conversion assembly which gives flexibility to customer to restore the original state i.e. from electric vehicle to IC powered vehicle with less efforts.

It is an object of the present invention as per one embodiment is to provide an electric vehicle which has low weight, low cost, high efficiency, good controllability throughout the entire speed range.

It is another object of the present invention is to provide a conversion system with an improved cooling performance of the electrochemical cells using natural air which less complicated than conventional conversion system.

Therefore, the present invention relates to a conversion assembly for a multi wheeled vehicle. The conversion assembly includes an electric machine operatively connected to a transmission assembly and a housing. As per preferred embodiment the conversion assembly is mounted to a front lower portion of the body frame of the multi wheeled vehicle by means of one or more engine mounting bracket.

As per one implementation, said conversion assembly is disposed below a fuel tank with at least a portion overlapping a side cover of the vehicle in side view.

As per one implementation, said housing is disposed upward of said electric machine.

As per one implementation, said electric machine configured to have one or more mounting legs.

As per one implementation, said housing configured to accommodate at least one electronic component and at least one electrochemical cell, wherein said housing is attached to said electric machine.

As per one implementation, said housing comprising of a first surface, a second surface, side surfaces, said side surfaces connecting said first surface and said second surface, and a secondary cover. The secondary cover is detachably attached to peripheral side edge of said housing, As per one implementation, said first surface configured to have plurality of slots, said slots are surrounded by one or more primary walls, said primary walls are protruding from a portion of said first surface.

As per one implementation, primary walls with said first surface defines a primary storage space, said primary storage space configured to accommodate at least one electronic component.

As per one implementation, said primary storage space is covered by a primary cover, said primary cover is detachably attached to a peripheral side edges of said primary walls.

As per one implementation, said primary cover configured to have vertical slots to guide the incoming air towards at least one electronic component.

As per one implementation, said second surface configured to have secondary storage space, said secondary storage space is defined by plurality of secondary walls protruding from a portion of said second surface.

As per one implementation, said first surface configured to have at least one slot below the primary storage space, said slot is extending in the lateral direction of the vehicle.

As per one implementation, said second surface is configured to have at least one opening to discharge the air.

As per one implementation, one of said side surfaces is configured to have plurality of louvers.

As per one implementation, one of said side surface configured to have plurality of holes, each of said hole adapted to receive an attachment means.

As per one implementation, one of said side surface configured to have plurality of opening to discharge the air.

As per one implementation, wherein first surface and second surface configured to have a partition rib, said partition rib is protruding in longitudinal direction of said vehicle.

As per one implementation, said transmission assembly comprising of a transmission case, a transmission cover detachably attached to said transmission case using attachment means; one or more drive gear, an intermediate shaft, one or more driven gear and a drive member.

As per one implementation, said drive gear is installed on an output shaft of said electric machine.

As per one implementation, said intermediate shaft is disposed parallel to said output shaft of said electric machine.

As per one implementation, said driven gear is installed on said intermediate shaft.

As per one implementation, said drive member is installed on said intermediate shaft, As per one implementation, said drive gear is operatively connected to driven gear.

As per one implementation, said transmission case is integrated to said electric machine.

As per one implementation, said transmission cover is configured to have one or more oil draining port and one or more oil pouring port.

As per one implementation, said intermediate shaft project on one side outside said transmission cover, said drive member is installed on said outside extension of said intermediate shaft.

As per one implementation, said transmission case includes one or more mounting yokes, said mounting yokes are configured to have openings adapted to receive attachment means to secure conversion assembly to a vehicle.

As per one implementation, said transmission case includes one or more mounting yokes, said mounting yokes are configured to have openings adapted to receive attachment means to secure electric machine to a body frame of a vehicle.

As per one implementation, said transmission assembly is configured to have a breathing chamber, said breathing chamber is configured to have maze type structure formed by said transmission case and said transmission cover butted together.

The embodiments of the present invention will now be described in detail with reference to the accompanying drawings. However, the present invention is not limited to the present embodiments. The size, shape, position, number and the composition of various elements of the device of the invention is exemplary only and various modifications are possible to a person skilled in the art without departing from the scope of the invention. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items. Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For the purposes of describing and defining the present invention it is noted that the term "electrochemical cells" is utilized herein to represent a combination of components and individual components, regardless of whether the components are combined with other components. For example, an "electrochemical cells" according to the present invention may comprise batteries, electrochemical conversion assembly or fuel cell, a vehicle incorporating an electrochemical conversion assembly according to the present invention, etc.

Figure 1A:
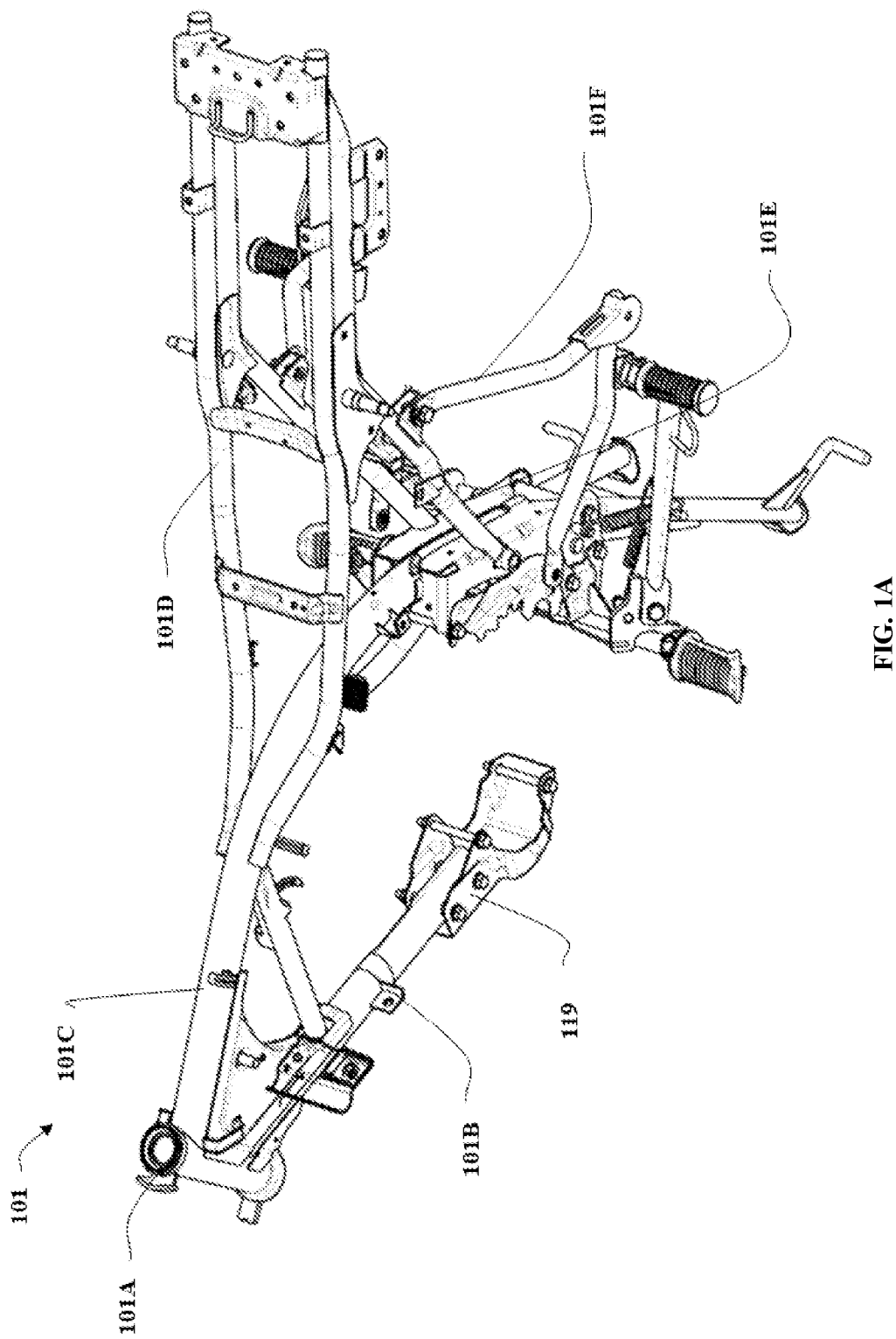
FIG. 1A illustrates a body frame of the multi wheeled vehicle.

FIG. 1 (Prior art) illustrates a left side view of the multi wheeled vehicle (100A). The multi wheeled vehicle (100A) includes a body frame (101) (as shown in FIG. 1A) to support different parts of said vehicle (100A). A head pipe (101A) is provided at a front end of the body frame (101). The head pipe (101A) supports a steering shaft (not shown) rotatably in a certain range. In an upper portion of the head pipe (101A), a handlebar (103) is rotatably integrally connected to the steering shaft. The handlebar (103) is used to steer the vehicle (100A) and is connected to a front wheel (104) through the steering shaft. An upper portion of the front wheel (104) is covered by a front fender (105) which prevents mud and water from getting deflected towards the steering shaft (not shown). Further, a front fork assembly (106) is supported partially on the front fender (105) and is connected to the front wheel (104). In a front portion of the body frame (101) a fuel tank (107) is arranged immediately behind the handlebar (103) and is disposed over an internal combustion engine; hereinafter 'engine' (108). A seat (109) is placed behind the fuel tank (107). The seat (109) includes a front rider portion and rear pillion portion. For the safety of the rider and in conformance with the traffic rules, a headlamp unit (110) and a pair of turn signal lamp unit (111) is provided in a front portion of the vehicle (100A). The headlamp unit (110) and the turn signal lamp unit (111) are housed in a headlamp housing assembly (112). The Suspension systems are provided for comfortable steering of the vehicle (100A) on the road. The front fork assembly (106), which forms the front suspension system, serves as rigidity component just like the body frame (101) (as shown in FIG. 1A). The front fork assembly (106) clamped to the head pipe (101A) through an upper bracket (102A) and a lower bracket (102B) is capable of being moved to the left and right. Further, a rear suspension system, which is a hydraulic damped arrangement, is connected to the body frame (101) (as shown in FIG. 1A). The rear suspension system comprises of two rear suspensions (113), the same may be disposed on the left side and the right side respectively of said vehicle (100). The engine (108) is mounted to a front lower portion of the body frame (101) (as shown in FIG. 1A) by means of one or more engine mounting bracket (119). The engine (108) is equipped with an exhaust system that includes an exhaust pipe (not shown) connected to the engine (108) and a muffler (not shown) connected to the exhaust pipe. The muffler (not shown) extends rearwards along the right side of a rear wheel (114). Power from the engine (108) is transmitted to the rear wheel (114) through a drive train (115), so as to drive and rotate the rear wheel (114). Thus, power from the engine (108) is transmitted to the rear wheel (114) rotatably supported at a rear end of a swing arm (116). A rear fender (117) for covering an upper side of the rear wheel (114) is mounted to a rear portion of body frame (101) (as shown in FIG. 1A) to prevent mud and water splashed by the rotating rear wheel (114) from entering the muffler, the engine (108) and other parts disposed close by. Further, for safety of a pillion rider, a saree guard (118) is provided.

FIG. 1A illustrates a detailed description of the body frame (101). The body frame (101) includes the head pipe (101A), a down tube (101B) extending downwards and rearwards from said head pipe (101A), at least a main tube (101C) extending rearwards from said head pipe (101A), a pair of rear tubes (101D) extending rearwards from a portion of said main tube (101C), a pair of side tubes (101E) extending inclinedly downwardly and forwardly from said pair of rear tubes (101D). Particularly, the body frame (101) forms the skeleton of the vehicle (100A) and provides rigidity to the vehicle (100A). More particularly, at least the pair of rear tubes (101D) and the pair of side tubes (101E) form a rear portion of the body frame (101) and contribute to rigidity thereof. Further, the rear portion of the body frame also includes a frame member (101F) to which the saree guard (118) (as shown in FIG. 1) is supported. In a front portion of the body frame (101), the engine (108) is supported. Particularly, said engine (108) is supported to the down tube (101B) by means of one or more engine mounting bracket (119). The drive train 115 (shown in FIG. 1) includes a gearbox containing gear train and a drive mechanism connecting the gear box to the rear wheel (114). Particularly, the gear train includes a plurality of gears.

Figure 2:
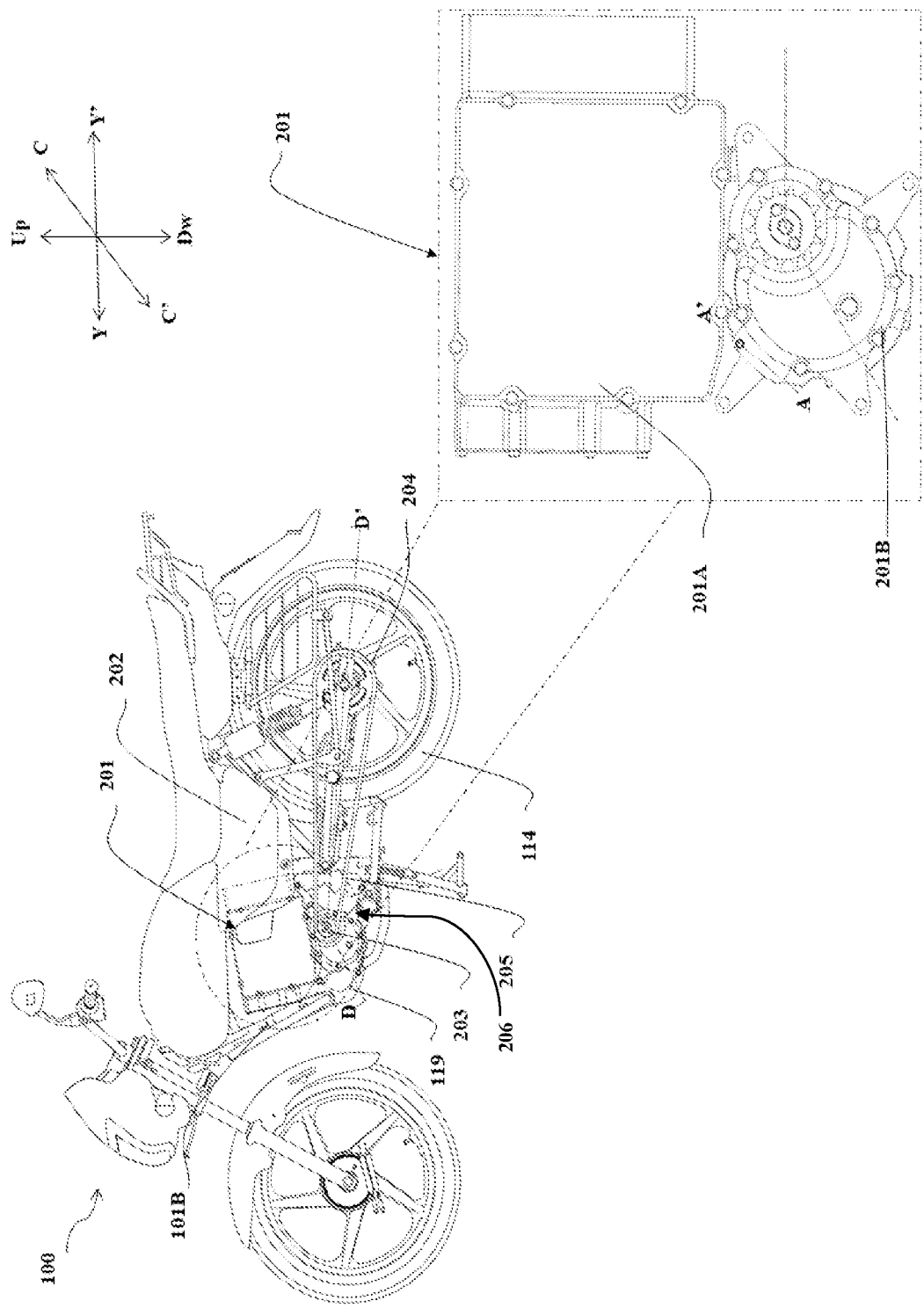
FIG. 2 illustrates a left side view of the multi wheeled vehicle and localized view of a conversion assembly as per preferred embodiment of the present invention.

FIG. 2 illustrates a left side view of the multi wheeled vehicle (100) and localized view of a conversion assembly (201) as per preferred embodiment of the present invention. As per one implementation, in a front portion of the body frame (101), a conversion assembly (201) is supported. Particularly, said conversion assembly (201) is supported to the down tube (101B) by means of one or more engine mounting bracket (119). The conversion assembly (201) is mounted in forwardly inclined position in the longitudinal direction (Y-Y') of the vehicle (100) such that a portion of conversion assembly (201) is covered by side panels (202) when viewed from side of the multi wheeled vehicle (100). The conversion assembly (201) comprising of an electric machine (201B) and a housing (201A). The conversion assembly (201) is operatively connected to the rear wheel (114) through drive train. As per preferred embodiment the drive train comprises of chain and sprocket arrangement. The drive train includes drive sprocket (203). The drive sprocket (203) operatively connected to a driven sprocket (204) through chain (205) to rotate the rear wheel.

Figure 3:
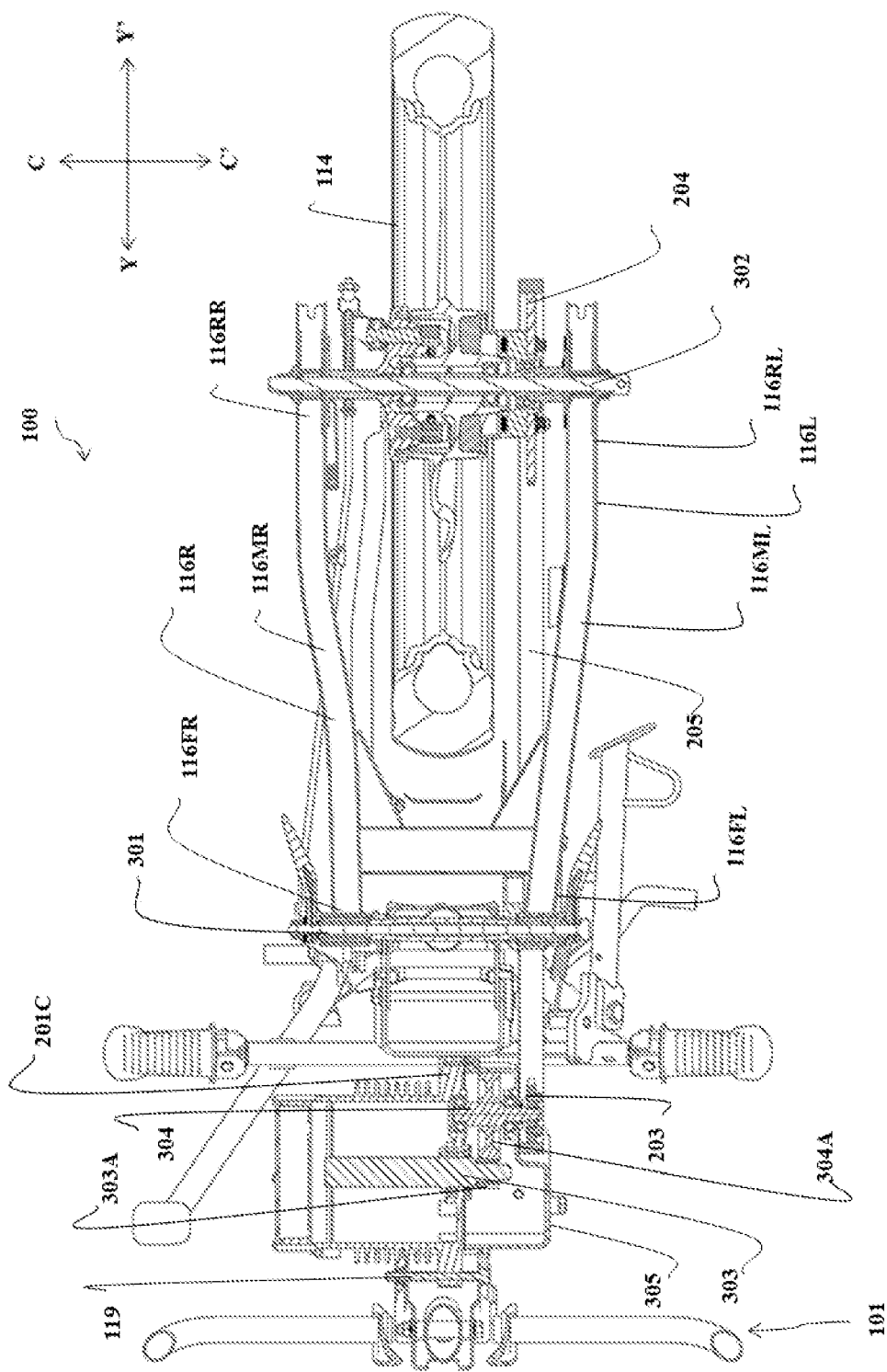
FIG. 3 illustrates a top cut section view across D-D' axis of the multi wheeled vehicle as per preferred embodiment of the present invention.

FIG. 3 illustrates a top cut section view across D-D' axis of the multi wheeled vehicle as per preferred embodiment of the present invention. The electric machine (201B) is operatively connected to a transmission assembly (115). The transmission assembly comprises of a transmission cover (305) and a transmission case (201C). A drive gear (303A) is installed on an output shaft (303) of the electric machine (201B). The output shaft (303) of the electric machine (201B) is parallel to an intermediate shaft (304). A driven gear (304A) is in mesh with the drive gear (303A) wherein said driven gear (304A) is installed on the intermediate shaft (304). The intermediate shaft (304) projects on one side outside said transmission cover (305). The drive sprocket (203) is installed on said outside extension of said intermediate shaft (304) such that it is operatively connected to the driven sprocket (204) through transmission member (205) e.g. chain or timer belt etc. The driven sprocket (204) is installed on a wheel axle (302). The wheel axle (302) is mounted on a swing arm (116). As per alternative embodiment, the drive member (203) can be drive pulley operatively connected to driven pulley through a belt. The swing arm (116) comprises of at least two arms, a first arm (116R) and a second arm (116L). In an embodiment, the first arm (116L) is disposed on a left side of the vehicle (100) whereas the second arm (116R) is disposed on a right side of the vehicle (100). In an implementation, the first arm (116L) and the second arm (116R) disposed substantially parallel to vehicle longitudinal axis (Y-Y') of the vehicle (100). The first arm (116L) further comprises of a front portion (116FL), a rear portion (116RL) and a middle portion (116ML) disposed between the front portion (116FL) and the rear portion (116RL). When viewed from the vehicle front direction (F), the front portion (116FL) is followed by middle portion (116ML) and then the rear portion (116RL). In an embodiment, the front portion (116FL), the middle portion (116ML) and the rear portion (116RL) are integrally formed with the first arm (116L). The front portion (116FL) can be connected to a toggle link assembly (301) which connects the swing arm (116) to the body frame (101) of the vehicle (100). The connection is by way of a bracket or bosses or similar mechanical means. The rear portion (116RL) supports the wheel axle (302). Further, the second arm (116R) is functionally identical to the first arm (116L), the second arm (116R) has a front portion (116FR) connected to the toggle link assembly (301), a rear portion (116RR) supports the wheel shaft (302), and a middle portion (116MR) disposed between the front portion (116FR) and the rear portion (116RR).

Figure 4:
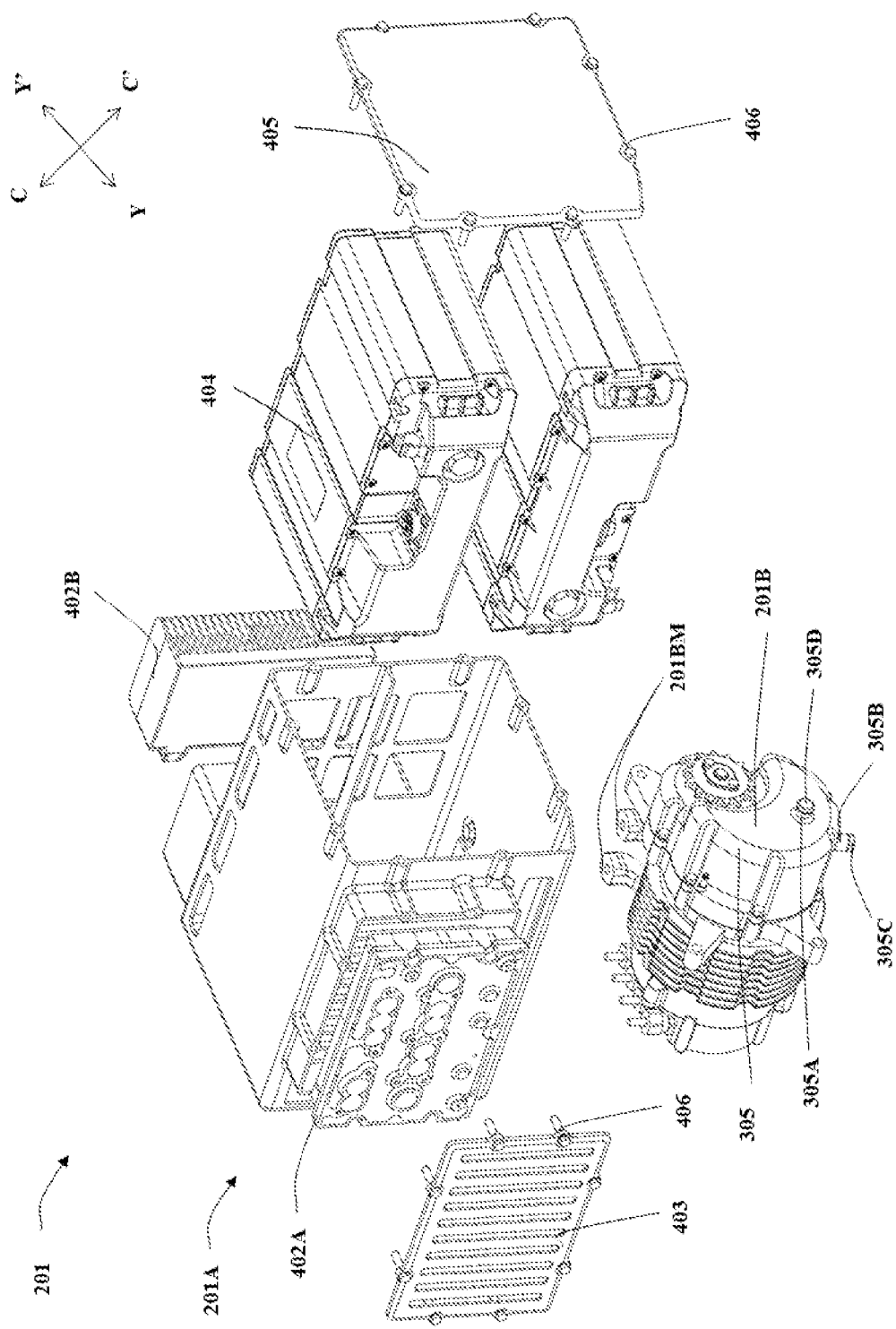
FIG. 4 illustrates an exploded view of the conversion assembly as per preferred embodiment of the present invention.

FIG. 4 illustrates an exploded perspective view of the conversion assembly (201) as per preferred embodiment of the present invention. The conversion assembly (201) comprising of the electric machine (201B) which is operatively connected to the transmission assembly and a housing (201A). The electric machine (201B) includes electric motor. The electric motor (201B) includes any type of suitable motor known in the art. The electric machine (201B) configured to have one or more mounting legs (201BM) adapted to secure the housing (201A) to the electrical machine (201B). The housing (201A) is configured to accommodate at least one electronic component (402A, 402B) and at least one electrochemical cell (404). As per one implementation, the electronic components (402A, 402B) includes motor controller, electronic control unit, on board charger etc. As per one implementation, a motor controller (402A) is accommodated on the housing (201A) in the front region of the vehicle (100) and is covered by a primary cover (403). This enables efficient cooling of the electronic component as well as ease of assembly & service without dismantling the conversion assembly from the vehicle. The primary cover (403) is detachably attached to the housing (201A) using attachment means (406). Further, the electrochemical cells (404) include one or more batteries (404). As per preferred embodiment the battery pack (404) are two in number. The batteries (404) are disposed in the housing (201A) and covered by secondary cover (405). The secondary cover (405) is detachably attached to the housing (201A) using attachment means (406). This enables ease of assembly, service & swapping of the energy units in one of the lateral directions of the vehicle as well as ensures the energy unit is well protected from environmental factors like mud, rain, stone hitting etc. The batteries (404) may be adapted to store electric energy in the form of chemical energy and is charged using on-board charger (402B). Further, in an alternative embodiment, the batteries (404) can be charged using outpost charge station by swapping the batteries. The batteries (404) provide electric energy to a motor controller (402A) for driving electric machine (201B). The motor controller (402A) algorithm controls the functioning of electric machine (201B) based on different riding modes and driving characteristics. As per alternative embodiment an electronic control unit may have inbuilt battery management system. Furthermore, the electric energy from the batteries (404) can be used to charge the auxiliary batteries (not shown) using DC-DC charger (not shown). The auxiliary batteries (not shown) adapted to power various subsystems in the vehicle (100).

Furthermore in an additional embodiment, the transmission cover (305) is provided with oil pouring port (305A) and oil drain port (305B). The oil drain port (305B) is positioned on the side of transmission cover (305), specifically, bottom surface of the transmission cover allowing the maximum amount of oil to be drained out. The oil drain port (305B) configured to receive an oil draining washer and a threaded oil draining bolt (305C) which are manually inserted. The oil pouring port (305A) is positioned on the upper side surface of the transmission cover (305). The oil pouring point (305A) is configured to revive the oil pouring washer and a threaded oil pouring bolt (305D). As both the oil pouring port (305A) and oil draining port (305B) are provided on the transmission cover (305), specifically on the same side ensures ease of serviceability while changing the oil.

Figure 5:
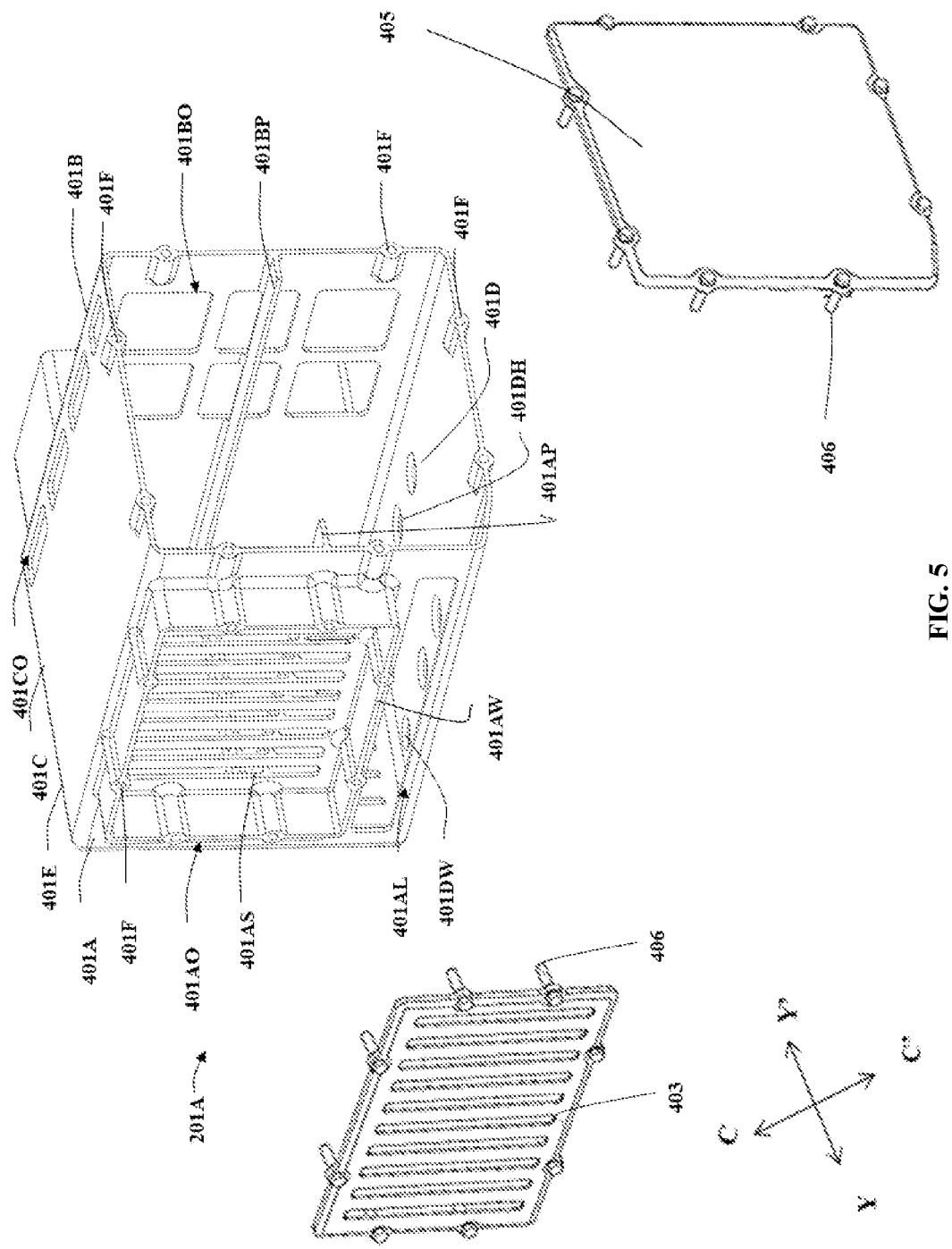
FIG. 5 illustrates a perspective view of the housing as per preferred embodiment of the present invention where few parts are omitted from the figure.

FIG. 5 illustrates a perspective view of the housing as per preferred embodiment of the invention where few parts are omitted from the figure for brevity. The housing (201A) configured to have a first surface (401A), a second surface (401B), and side surfaces (401C, 401D, 401E). The side surfaces (401C, 401D, 401E) are connecting said first surface (401A) and said second surface (401B). The side surfaces (401C, 401D, 401E) includes top side surface (401C), bottom side surface (401D) and right side surface (401E). The first surface (401A) is configured to have plurality of slots (401AS). The slots (401AS) are surrounded by one or more primary walls (401AW). The primary walls (401AW) are protruding from a portion of said first surface (401A) such that it is extending in a longitudinal direction (Y-Y') of the housing (201A). The primary walls (401AW) with first surface (401A) define a primary storage space. The primary storage space configured to accommodate at least one electronic component (402A) (as shown in FIG. 4). The peripheral side edge of said primary wall (401AW) configured to have plurality of threaded opening (401F) adapted to receive the attachment means (406) to secure the primary cover (403) to the peripheral side edge of said primary wall (401AW). Thus, the primary storage space is covered by the primary cover (403) and the first surface (401A). Further, the first surface (401A) configured to have at least one opening (401AL) below the primary storage space. The opening (401AL) is extending in the lateral direction (C-C') of the vehicle (100). Furthermore, the peripheral side edges of first surface (401A), second surface (401B), top side surface (401C) and bottom side surface (401D) configured to have threaded openings (401F). The threaded opening (401F) adapted to receive the attachment means (406) to secure the secondary cover (405) to the housing (201).

Further, each of first surface (401A), second surface (401B), right side wall (401E) configured to have partition rib or protrusion (401AP, 401BP). The partition rib or protrusions (401AP, 401BP) are projecting inwardly in the housing (201A) to facilitate the easy removal or insertion of the batteries (404). The partition rib or protrusion (401AP, 401BP) on first surface (401A) and second surface (401B) are substantially parallel and opposite to each other. Further the partition rib or protrusion (not shown) in the right side wall (401E) is projecting inwardly in the lateral direction (C-C') of the enclosure (401). The partition rib or protrusion (401AP, 401BP) provide different virtual compartment in the housing (201A) to accommodate the batteries (404). In addition to that, the partition rib or protrusion (401AP, 401BP) provides straight alignment of the batteries (404) in packed condition. Therefore, the batteries (404) never loose lose their alignment horizontally and vertically even when the vehicle runs on rough roads.

Further, the first surface (401A), second surface (401B) and top side surface (401C) of the housing (201A) is configured to have opening (401AO, 401BO, 401CO) of predetermined shape. The predetermined shape includes rectangular geometry. Further, the bottom side surface (401D) of the housing (201A) is configured to have plurality of holes (401DH) adapted to receive the threaded fasteners (not shown) to secure the housing (201A) to the mounting legs (201BM) of the electrical machine (201). Further, the bottom surface (401D) is configured to have at least two drain holes (401DW) to drain out the water if accumulated inside the housing (201A) to meet all weather conditions.

Figure 6:
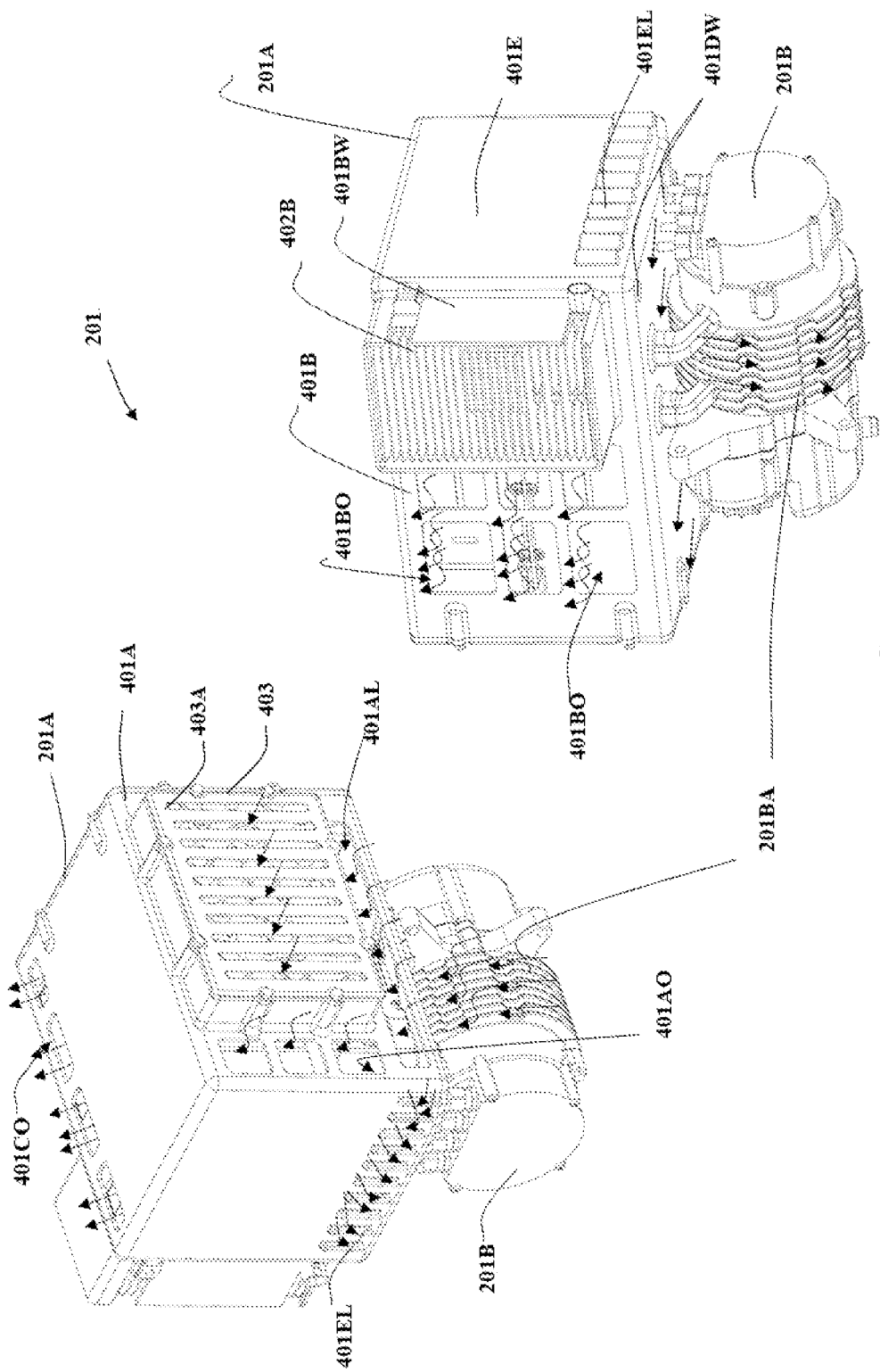
FIG. 6 illustrates the front and rear perspective views of the conversion assembly as per preferred embodiment of the present invention.

FIG. 6 illustrates the front and rear perspective views of the conversion assembly (201) as per preferred embodiment of the invention. The housing (201) is configured to increase the amount of incoming air and to minimize the disturbance and reduction of airflow. This is accomplished through plurality of openings (401AO) and slots (401AL) in the first surface (401A) and louvers (401EL) in the right side surface (401E). The incoming air is guided by plurality of vertical slots (403A) in the primary cover (403) towards the motor controller (402A) (as shown in FIG. 4). The air passes through motor controller (402A), and heat is exchanged to the natural cold air, which in turn further guided by plurality of slots (401AS) (as shown in FIG. 5) in the first surface (401A) towards plurality of batteries (404) (as shown in FIG. 4). The air passes through plurality of batteries (404) (as shown in FIG. 4) and is concurrently discharged from the housing (201A) through opening in top side surface (401CO) and plurality of openings (401BO) in the second surface (401B) as shown by the arrows.

Furthermore, pluralities of louvers (401EL) are provided in the right side surface (401E) for guiding a flow of incoming air towards the batteries (404). The second surface (401B) is configured to have secondary storage space. The secondary storage space is defined by plurality of secondary walls (401BW) protruding from a portion of said second surface (401B). The secondary walls (401BW) extend in the longitudinal direction (Y-Y') of the vehicle (100). The secondary storage space accommodates at least one electronic component. As per one implementation, the electronic components includes onboard charger (402B). Further, the electric machine (201B) configured to have cooling fins (201BA). The cooling fins (201BA) are perpendicular to the outer casing of the electric machine (201B).

Figure 7:
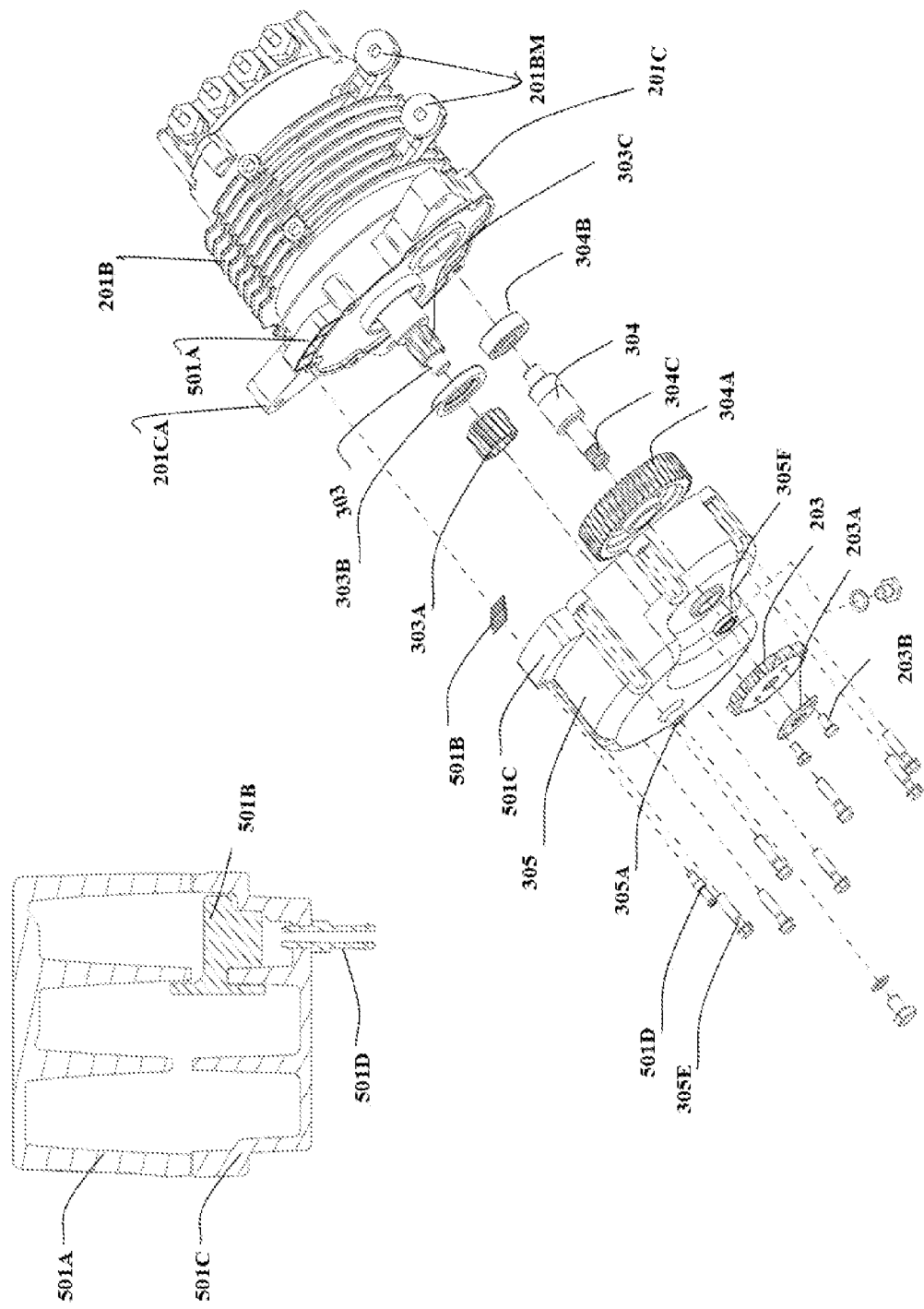
FIG. 7 illustrates an exploded view of the electric machine operatively connected to the transmission assembly as per preferred embodiment of the present invention and a localized cut section view of the conversion assembly across A-A' axis showing a breathing chamber.

FIG. 7 illustrates an exploded view of the electric machine (201A) operatively connected to the transmission assembly as per first embodiment of the invention and a localized cut section view of conversion assembly across A-A axis showing breathing chamber. As per preferred embodiment, the transmission case (201C) is integrated with the electric machine (201B). As per alternative embodiment, the transmission case (201C) is detachably attached to the electric machine (201B) using attachment means. The transmission case (201C) configured to have plurality of mounting yokes (201CA) adapted to secure the conversion assembly (201) to the vehicle (100). As per alternative embodiment, the transmission case (201C) and electric machine (201B) can be separate components which are detachably attached using attachment means. A gear ratio of transmission assembly is configured such that the output rotation has a different angular velocity and torque as compared to electric machine (201B) input through output shaft (303). The transmission assembly includes the drive gear (303A), the driven gear (304A) and the intermediate shaft (304). The drive gear (303A) has a toothed exterior periphery and internal splines. Further, the driven gear (304A) has a toothed exterior periphery configured to mesh with toothed exterior periphery of the drive gear (303A). The drive gear (303A) is fixedly installed on external splines (303C) of the output shaft (303). Further, the intermediate shaft (304) is configured to have external splines. The driven gear (304A) configured to have internal splines is fixedly installed on the external splines of the intermediate shaft (304). The one end of the intermediate shaft (304) is rotatably mounted on the transmission case (201C) and other end is rotatably mounted on said transmission cover (305). The intermediate shaft (304) is rotatably mounted to the transmission case (201C) and transmission cover (305) using pair of bearing (304B) to provide frictionless rotation. Further, the intermediate shaft (304) projects on one side outside the transmission cover (305). The outside extension of the intermediate shaft (304) configured to have external splines (304C) is adapted to receive the drive member (203). In one implementation, the drive member (203) is drive sprocket (203). The drive sprocket (203) is fixedly installed on said outside extension of said intermediate shaft (304) using a lock plate (203A) and the threaded fasteners (203B).

Further, when the vehicle (100) transmission is operating, the oil is splashed or churned up from inner bottom portion by the driven gear (304A) disposed inside the transmission cover (305). Thus, continuous churning of oil increases the temperature of oil and pressure inside the transmission assembly. This result in making of fumes carrying oil inside the transmission assembly. Thus, to reduce the pressure inside the transmission assembly, a breathing chamber (501A, 501C) that releases fumes to outside atmosphere is provided on the upper side of the transmission assembly. The breathing chamber (501A, 501C) prevents the oil from being discharged to the atmosphere. Thus, breathing chamber (501A, 501C) configured has maze type structure. The maze type structure is formed in transmission case (201C) and transmission cover (305) butted together using attachment means (305E). The breathing chamber (501A, 501C) includes a filter member (501B) to separate oil from fumes. Thus, the oil is trapped inside the filter member (501B) and air is released from a breather tube (501D) provided in the transmission cover (305). Thereby, the breathing chamber (501A, 501C) prevents the loss of lubrication oil and the fumes without oil are vented out to the atmosphere.

Further, the transmission case (201C) is configured to accommodate an oil seal (303B) to prevent oil leakage to electric machine (201B). Furthermore, the transmission case is provided with oil seal (305F) intended to prevent the leakage of oil from the transmission cover (305.)

According to above architecture, the primary efficacy of the present invention is that the conversion assembly allows for improved cooling performance with no power consumption due to radiator or special cooling loops etc. As batteries, electronic components operate at desired temperature range due to cooling from the natural air which passes through plurality of openings, slots and lovers in the housing. Since, the housing is profiled to have plurality of openings, slots and lovers at predetermined location, thus the incoming air can be easily guided into the housing without use of any external suction means like blowing fan etc. Further, the electric motor configured to have plurality of cooling fins on the outer casing which allows more heat dissipation. The high heat transfer from electric machine is ensured as fins are coming in contact with incoming air at ambient temperature.

According to above architecture, the primary efficacy of the present invention is that the conversion assembly is easy to install due to absence of external means like radiator etc. which involves plurality of pipes. Further, radiator requires external power to run the cooling fan/blowers which will consume more energy and lead to frequent discharge of the batteries.

According to above architecture, the primary efficacy of the present invention is that the primary cover is provided for preventing a foreign substance like large stones etc. from being introduced into primary storage space.

According to above architecture, the primary efficacy of the present invention is that housing is configured to accommodate plurality of components at predetermined location to ensure efficient cooling without use of external means.

According to above architecture, the primary efficacy of the present invention is that the oil drain port and oil pouring port are configured on the transmission cover within the ergonomical reach of the user.

According to above architecture, the primary efficacy of the present invention is that the conversion assembly is implementable without changing existing transmission system, to convert existing fossil fuel based vehicle with automatic or manual transmission into electric vehicle.

According to above architecture, the primary efficacy of the present invention is that the conversion assembly is of less weight and easy to install because low capacity motor operatively connected to transmission assembly of predetermined gear ratio which provides optimum torque to propel vehicles in all terrain and weather conditions. Because of low capacity electric machine the less number of batteries are required.

According to above architecture, the primary efficacy of the present invention is that the conversion assembly gives economical solution to customers in terms of efficiency as it provides electric vehicle which has low weight, low cost, high efficiency, good controllability throughout the entire speed range without use of high capacity motors. Further, provides improved thermal management to keep the batteries at optimum temperature without use of external means.

According to above architecture, the primary efficacy of the present invention is that the conversion assembly gives retrofit flexibility which can be coupled to the platform of new vehicle for different market segments by OEM's because present invention provides flexibility to manufacture variants in form of size, capacity of vehicle, range of usage, cost, ease of manufacturing, etc. The design of conversion assembly is flexible to cater to the variants and the demands and enable modified versions with minimum changes in the vehicle layout, assembly time, manufacturing set-up etc. and does not require major revamping of core processes to prepare for mass production of electric vehicles during transition from internal combustion engines.

According to above architecture, the primary efficacy of the present invention is that the conversion assembly provides flexibility to customer to restore the original state i.e. from electric vehicle to IC powered vehicle with less efforts due to less weight and simple design. The customer can restore to the vehicle to IC powered vehicle just by unbolting mount screws configured to attach the conversion assembly to the frame assembly. Further, removal operation of conversion assembly can be performed without use of specialized tools and jack.

According to above architecture, the primary efficacy of the present invention is that the conversion assembly provides effective and reliable lubrication of a transmission assembly operatively connected to an electric machine due to breathing chamber. The breathing chamber maintains optimum pressure in the transmission assembly and prevents the loss of lubrication oil by allowing the fumes without oil vented to the atmosphere through filter member.

While the present invention has been shown and described with reference to the foregoing preferred embodiments, it will be apparent to those skilled in the art that changes in form, connection, and detail may be made therein without departing from the spirit and scope of the invention.

| List of references | |
|---|---|
| F- Front | 101 - Body frame |
| R -Rear | 101A- Head pipe |
| C-C' - Lateral axis | 102A- Upper bracket |
| Y-Y' - Longitudinal axis | 102B- Lower bracket |
| 100A - Conventional vehicle | 103 - Handle bar |
| 100 - Vehicle | 104 - Front wheel |
| 105 - Front fender | 116ML - Middle portion - Left side swing arm |
| 106 - Front fork assembly | |
| 107 - Fuel tank | 116RL - Rear portion - Left side swing arm |
| 108- Engine | 117 - Rear fender |
| 109-Seat | 118 - Saree guard |
| 110 - Head lamp unit | 119 - Engine mounting bracket |
| 111 - Turn signal lamp | 201 - Conversion assembly |
| 112 - Head lamp housing | 201A - Housing |
| 113 - Rear suspension | 201B - Electric machine |
| 114 - Rear wheel | 201BA - Cooling fins |
| 115 - Drivetrain of IC powered vehicle | 201BM - Mounting legs |
| 116 - Swing arm | 201C - Transmission case |
| 116R - Right side swing arm | 201CA - Mounting yokes in transmission case |
| 116L - Left side swing arm | 202 - Side covers |
| 116FR - Front portion - Right side swing arm | 203 - Drive member/drive sprocket |
| 116MR - Middle portion - Right side swing arm | 203A - Lock plate |
| | 203B - Threaded fasteners |
| 116RR - Rear portion - Right side swing arm | 204 - Driven sprocket |
| | 205 - Chain |
| 116FL- Front portion - Left side swing arm | 301 - Toggle link |
| 302 - Wheel axle | 401AL - Slot extending in lateral direction |
| 303 - Output shaft | |
| 303A - Drive gear | 401AW - Primary wall |
| 303B - Oil seal | 401AP - Partition rib or protrusion on first surface |
| 303C - Mounting yoke | |
| 304 -Intermediate shaft | 401B - Second surface |
| 304A - Driven gear | 401BO - Opening in second surface |
| 304B - Bearing | 401BP - Partition rib or protrusion on second surface |
| 304C - Splines on intermediate shaft | |
| | 401BW - Secondary wall |
| | 401C - Top side surface |
| 305 - Transmission cover | 401CO - Opening in top side surface |
| 305A - Oil pouring port | |

| List of references | |
|---|---|
| 305B - Oil draining port | 401D - Bottom side surface |
| 305C- Oil draining bolt | 401DH - Holes in the bottom surface |
| 305D- Oil pouring bolt | |
| 305E - Attachment means for connecting transmission case to transmission cover | 401DO - Water drain hole |
| | 401EL - Right side surface |
| | 401EL - Louvers |
| 305F - Transmission cover oil seal | 401F - Threaded openings |
| 401A - First surface | 402A - Motor controller |
| 401AO - Opening in first surface | 402B - Onboard charger |
| 401AS - Slots in first surface | 403 - Primary cover |
| 403A - Plurality of vertical slots | 406 - Threaded fasteners |
| 404 - Electrochemical cells/Batteries | 501A, 501B - Breathing chamber |
| | 501C - Filter member |
| 405 - Secondary cover | 501D - Breather tube |

We claim:

1. A multi wheeled vehicle comprising:
   a body frame that includes:
      a head pipe;
   a conversion assembly that includes:
      an electric machine operatively connected to a transmission assembly; and
   a housing configured to accommodate at least one electronic component and at least one electrochemical cell,
   wherein the housing is attached to the electric machine,
   wherein the conversion assembly is mounted to a front lower portion of the body frame by means of one or more engine mounting brackets,
   wherein the conversion assembly is disposed below a fuel tank, and
   wherein at least a portion of the conversion assembly is overlapping a side cover of the multi wheeled vehicle in a vehicle side view.

2. A conversion assembly for a multi wheeled vehicle, comprising:
   an electric machine configured to have one or more mounting legs;
   a housing configured to accommodate at least one electronic component and at least one electrochemical cell; and
   a transmission assembly operatively connected to the electric machine,
   wherein the housing is attached to the electric machine through the one or more mounting legs, and
   wherein the housing comprises:
      a first surface;
      a second surface;
      a plurality of side surfaces that connects the first surface and the second surface; and
      a secondary cover detachably attached to peripheral side edge of the housing,
         wherein the first surface is configured to have plurality of slots,
         wherein the slots are surrounded by one or more primary walls, and
         wherein the one or more primary walls are protruding from a portion of the first surface.

3. The conversion assembly as claimed in claim 2, wherein the housing is disposable upward of the electric machine.

4. The conversion assembly as claimed in claim 2, wherein the one or more primary walls along with the first surface define a primary storage space that is configured to accommodate at least one electronic component.

5. The conversion assembly as claimed in claim 4, wherein the primary storage space is covered by a primary cover that is detachably attached to peripheral side edges of the primary walls.

6. The conversion assembly as claimed in claim 5, wherein the primary cover is configured to have vertical slots to guide the incoming air towards at least one electronic component.

7. The conversion assembly as claimed in claim 2, wherein the second surface is configured to have a secondary storage space that is defined by plurality of secondary walls, the plurality of secondary walls protruding from a portion of the second surface.

8. The conversion assembly as claimed in claim 2,
wherein the first surface is configured to have at least one slot below the primary storage space, and
wherein the slot is extended in a lateral direction of the vehicle.

9. The conversion assembly as claimed in claim 2, wherein the second surface is configured to have at least one opening to discharge the incoming air.

10. The conversion assembly as claimed in claim 2, wherein one of the side surfaces is configured to have plurality of louvers.

11. The conversion assembly as claimed in claim 2,
wherein one of the side surfaces is configured to have plurality of holes, and
wherein each of the hole is adapted to receive an attachment means.

12. The conversion assembly as claimed in claim 2, wherein one of the side surfaces is configured to have plurality of openings configured to discharge the air.

13. The conversion assembly as claimed in claim 2, wherein the first surface and the second surface are configured to have a partition rib that is protruding inwardly in a longitudinal direction.

14. The conversion assembly as claimed in claim 2, wherein the transmission assembly comprises:
a transmission case;
a transmission cover detachably attached to the transmission case using an attachment means;
a drive gear installed on an output shaft of the electric machine;
an intermediate shaft disposed parallel to the output shaft of the electric machine;
a driven gear installed on the intermediate shaft; and
a drive member installed on the intermediate shaft,
wherein the drive gear is operatively connected to the driven gear.

15. The conversion assembly as claimed in claim 14, wherein the transmission case is integrated to the electric machine.

16. The conversion assembly as claimed in claim 14, wherein the transmission cover is configured to have one or more oil draining ports and one or more oil pouring ports.

17. The conversion assembly as claimed in claim 14,
wherein the intermediate shaft projects on one side of the transmission cover, and
wherein the drive member is installed on the projected extension of the intermediate shaft.

18. The conversion assembly as claimed in claim 14, wherein the transmission case includes one or more mounting yokes configured to have openings adapted to receive the attachment means to secure conversion assembly to the vehicle.

19. The conversion assembly as claimed in claim 14, wherein the transmission assembly is configured to have a breathing chamber configured to have a maze type structure that is formed by the transmission case and the transmission cover butted together.

* * * * *